US011892339B2

(12) United States Patent
Alemany (10) Patent No.: US 11,892,339 B2
(45) Date of Patent: Feb. 6, 2024

(54) FOOD INVENTORY METHOD AND SYSTEM (71) Applicant: Alejandro Alemany, Miramar, FL (US)

(72) Inventor: Alejandro Alemany, Miramar, FL (US)

( * ) Notice: Subject to any disclaimer, the term of this patent is extended or adjusted under 35 U.S.C. 154(b) by 408 days.

(21) Appl. No.: 17/464,611

(22) Filed: Sep. 1, 2021

(65) Prior Publication Data

US 2023/0063985 A1 Mar. 2, 2023

(51) Int. Cl.
| | |
|---|---|
| *G01G 19/414* | (2006.01) |
| *G01G 23/37* | (2006.01) |
| *G06T 15/20* | (2011.01) |
| *G06Q 10/0875* | (2023.01) |
| *G06T 7/70* | (2017.01) |
| *G06V 20/52* | (2022.01) |

(52) U.S. Cl.
CPC ..... *G01G 19/4144* (2013.01); *G01G 23/3735* (2013.01); *G06Q 10/0875* (2013.01); *G06T 7/70* (2017.01); *G06T 15/205* (2013.01); *G06V 20/52* (2022.01); *G06T 2207/30242* (2013.01)

(58) Field of Classification Search
CPC .......... G01G 19/4414; G01G 23/3735; G01G 19/42; G06Q 10/0875; G06T 7/70; G06T 15/205; G06T 2207/30242; G06V 20/52; G06V 10/26; G06V 20/647; G06V 20/68
USPC .......................................................... 177/4
See application file for complete search history.

(56) References Cited

U.S. PATENT DOCUMENTS

| | | | |
|---|---|---|---|
| 8,091,782 B2 | 1/2012 | Cato et al. | |
| 8,502,645 B2 | 8/2013 | Thomas et al. | |
| 10,018,402 B2* | 7/2018 | Sumihiro | F25D 11/00 |
| 10,169,660 B1 | 1/2019 | Ren et al. | |
| 10,386,116 B2* | 8/2019 | Ryu | F25D 29/00 |
| 10,817,834 B2 | 10/2020 | McCoy | |
| 10,935,310 B2 | 3/2021 | Junge et al. | |
| 10,949,797 B2 | 3/2021 | Elazary et al. | |
| 11,288,506 B2* | 3/2022 | Ryu | H04N 23/54 |
| 11,506,448 B2* | 11/2022 | Ge | F25D 29/00 |
| 2007/0050271 A1 | 3/2007 | Ufford et al. | |
| 2014/0229343 A1 | 8/2014 | Higgins et al. | |
| 2020/0218296 A1 | 7/2020 | Tiwari et al. | |

* cited by examiner

*Primary Examiner* — Jacques M Saint Surin
(74) *Attorney, Agent, or Firm* — Mark Terry (57) ABSTRACT

A food inventory tracking system within a refrigerated food storage compartment includes cameras configured for capturing images of food, load cell sensors for taking weight measurements of food and a computing system for reading images from the cameras and weight measurements from the load cell sensors, generating a three-dimensional location map of an interior of the refrigerated food storage compartment, mapping the images and weight measurements to segments of the three-dimensional location map, such that each segment of the three-dimensional location map is associated with images and weight measurements, identifying a type of food item within said segments based on the images and weight measurements associated with said segment, calculating a current amount of said food item based reporting to a user the type of said food item and the amount of said food item.

11 Claims, 8 Drawing Sheets

FOOD INVENTORY METHOD AND SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to food service and catering, and more specifically, the claimed subject matter relates to the field of technology for facilitating food service and catering.

BACKGROUND

Maintaining adequate stock of necessary supplies is crucial to the proper functioning of a successful restaurant or other food provision business. Traditional methods of maintaining adequate stock include manually examining stock in anticipation of purchasing trends to determine which ingredients should be purchased.

The above-mentioned method of maintaining adequate stock, however, is prone to human-error, as it may be challenging and time-consuming to anticipate what customers may order and which ingredients may be used as purchasing trends fluctuate. It may also be physically strenuous to manually weigh heavy packages of ingredients, consuming the employees' time and energy that may be used more productively for other restaurant functions.

In terms of time, restaurants are often under immense pressure to serve their meals under tight time constraints, and therefore are put at a disadvantage in terms of service by stocking processes that detract from employees' ability to adequately serve customers, whether that be preparing meals or serving meals.

In terms of cost, restaurants have complex inventory considerations where they must consider the shelf life of perishable goods, the fluctuating prices of goods according to their suppliers' harvest, anticipated purchasing trends, and contingency plans should customers' orders differ from those anticipated trends. These variables are difficult to predict, and a mistaken prediction may be costly to the restaurant. Therefore, one less variable in an already complex equation in terms of the cost of stocking will conserve restaurant resources and give them a competitive edge over other restaurants still using antiquated methods.

In terms of liability, the physical exertion required to manually weigh heavy packages of ingredients may expose the restaurant to worker's compensation claims in the event that an employee mistakenly injures themselves while lifting and hauling supplies. This is not only costly to the restaurant, but also damages their reputation and, depending on the severity of the employees' injuries, may permanently prevent the employee from engaging in physical labor, which raises ethical concerns.

In terms of food waste, it can often be difficult to predict when certain supplies will perish, and therefore there is a risk of food reaching its expiration date before it is used by the restaurant. This performs a disservice to the greater community that may include people and families experiencing food insecurity, which raises ethical concerns.

One current solution to the aforementioned problems include scales that indicate the weight of remaining stock to assist restaurant employees in anticipating which ingredients must be replenished. The aforementioned solution to the problem, while helpful, is not sufficiently sophisticated to account for the complex variables of perishable goods, anticipated purchasing trends, and contingency plans should customers' orders differ from those anticipated trends As a result of the previously recognized issues, a need exists for a system and method that facilitates the taking of inventory for restaurants and other food provision businesses.

BRIEF SUMMARY

In one embodiment, a food inventory tracking system within a refrigerated food storage compartment is disclosed. The system includes at least four rear-facing cameras located at a forward end of the refrigerated food storage compartment, wherein the cameras are configured for capturing images of food stored within the refrigerated food storage compartment, at least four forward-facing cameras located at a rear end of the refrigerated food storage compartment, wherein the cameras are configured for capturing images of food stored within the refrigerated food storage compartment, at least four load cell sensors located within the refrigerated food storage compartment, wherein the at least four load cell sensors are configured for taking weight measurements of food stored within the refrigerated food storage compartment, a computing system including a processor a memory, the computing system configured for generating a three-dimensional location map of an interior of the refrigerated food storage compartment, reading images from the at least four rear-facing cameras, reading images from the at least four forward-facing cameras, and reading weight measurements from the at least four load cell sensors, mapping the images from the at least four rear-facing cameras to segments of the three-dimensional location map, mapping the images from the at least four forward-facing cameras to segments of the three-dimensional location map, and mapping the weight measurements to segments of the three-dimensional location map, such that each segment of the three-dimensional location map is associated with images and weight measurements, for each segment of the three-dimensional location map, identifying a type of food item within said segment based on the images and weight measurements associated with said segment, for each food item that was identified, calculating a current amount of said food item based on the images and weight measurements associated with the segment in which the food item is located, and for each food item that was identified, reporting to a user the type of said food item and the amount of said food item.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

The disclosed embodiments improve upon the issues identified within the prior art by provided a system that quickly and efficiently provides a real time inventory of food items within a refrigerated food compartment. The claimed system uses cameras and scales to collect information about food items within a refrigerated food compartment and provide a real time inventory. Therefore, the disclosed embodiments reduce or eliminate the need for consumers to take manual inventory, which may be tedious and time consuming. The disclosed embodiments also facilitate a more rapid and accurate food inventory process, which results in savings in food waste, man hours and general resources.

Figure 1A:
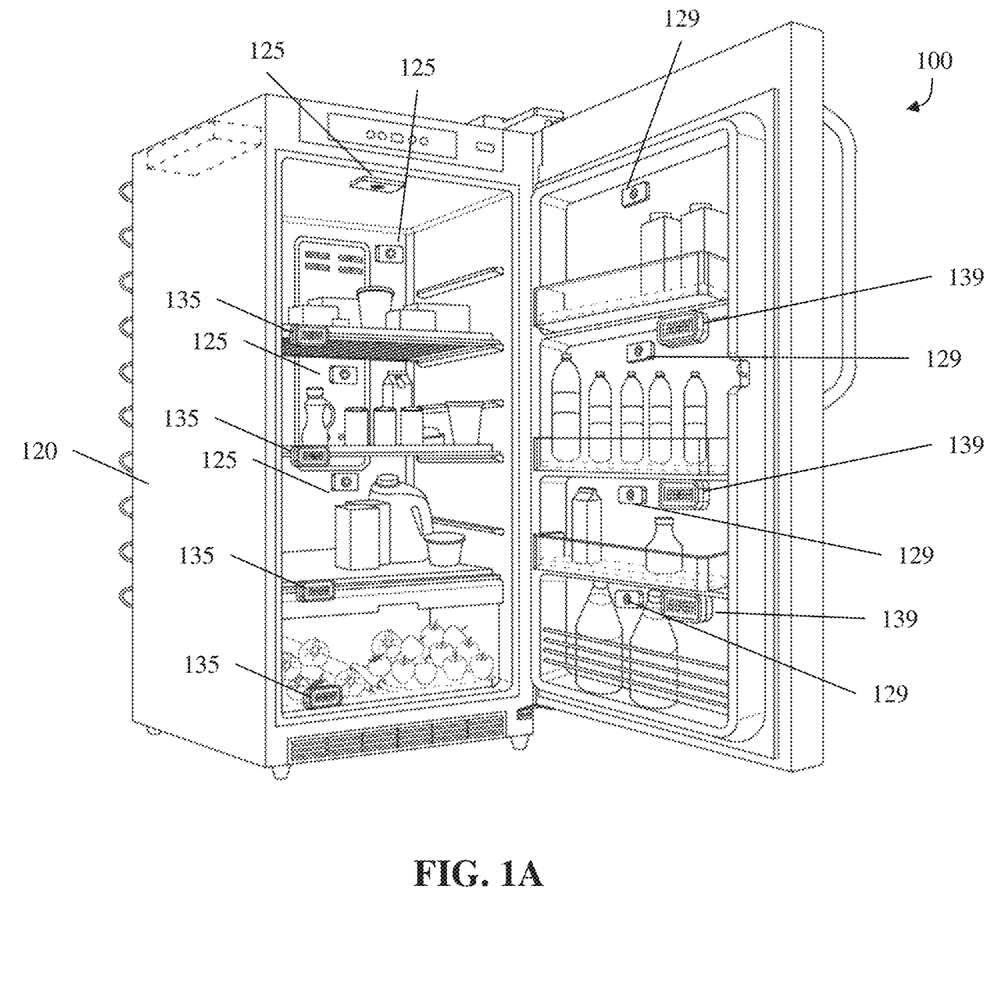
FIG. 1A is a front perspective view of a system for facilitating food inventory over a communications network, in accordance with one embodiment.
Figure 1B:
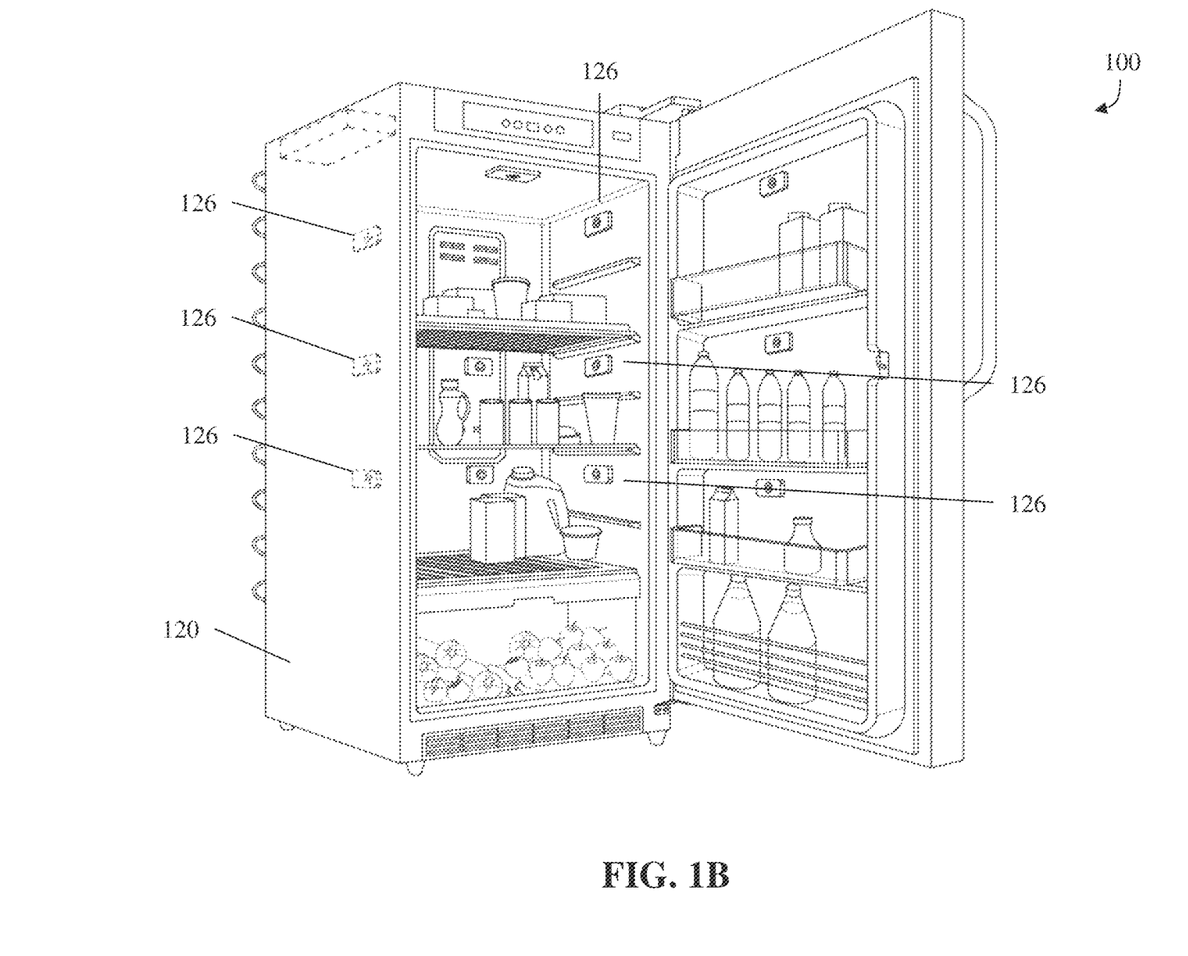
FIG. 1B is another front perspective view of the system for facilitating food inventory over a communications network, in accordance with one embodiment.

Referring now to the drawing figures in which like reference designators refer to like elements, there is shown in FIGS. 1A-1B front perspective views of a system 100 for facilitating food inventory over a communications network, in accordance with one embodiment. FIG. 1A shows a refrigerator 120 including at least four rear facing cameras 129 located on the door of the refrigerator and facing towards the rear of the refrigerator. FIG. 1A also shows at least four forward facing cameras 125 located within the refrigerator and facing towards the front of the refrigerator. FIG. 1A further shows multiple scales or weighing device 139 located in the door of the refrigerator, configured for weighing the food items that are placed on top of the scale of weighing device. FIG. 1A also shows multiple scales or weighing device 135 located within the refrigerator, configured for weighing the food items that are placed on top of the scale of weighing device. FIG. 1B shows a refrigerator 120 including at least three laterally placed cameras 126 located on each side wall of the refrigerator and facing towards the interior of the refrigerator.

Figure 2:
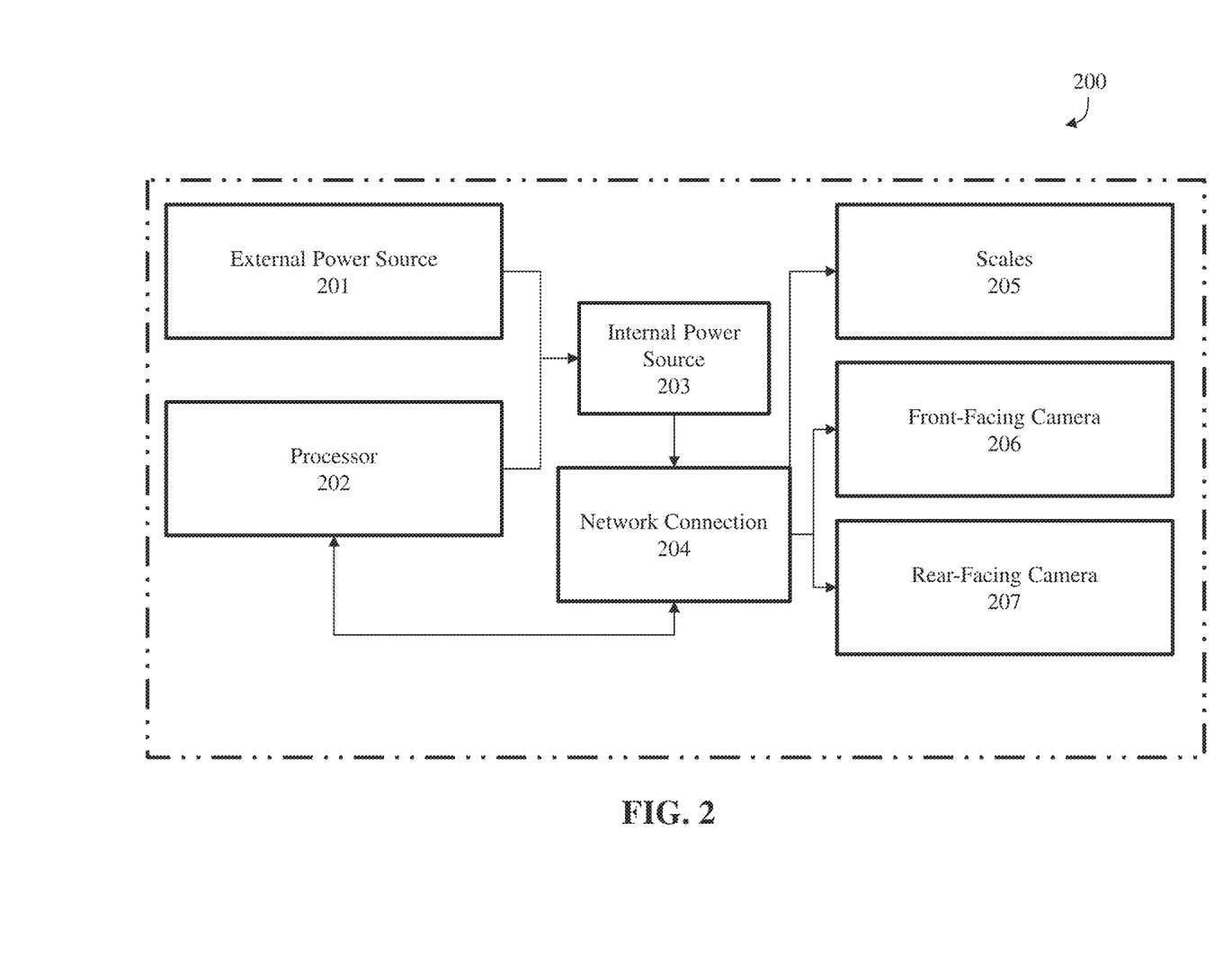
FIG. 2 is block diagram illustrating the main components of the system for facilitating food inventory over a communications network, in accordance with one embodiment.

FIG. 2 is block diagram illustrating the main components of the system 200 for facilitating food inventory over a communications network, in accordance with one embodiment. FIG. 2 shows external power source 201, which converts household electric current from DC current to low-voltage AC current. The processor 202, which may be a computer 600 (see below), transmits instructions to the other components of the system 200 as the central hub of the device. The internal power source 203 converts power from AC current to DC current and regulates the DC output voltage to the tolerances required by other components. The network connection 204 consists of devices distributing resources over a set of network nodes using communication protocols. The network nodes consist of the external power source 201, the processor 202, the internal power source 203, the scales 205, and the front-facing and rear-facing cameras 206, 207 communicating over wireless communications, such as Wi-Fi, and optionally various cloud applications.

The scales 205 consist of a device that weighs objects placed upon it and conveys that weight in units such as pounds. The front-facing and rear-facing cameras 206 and 207 are optical instruments used to analyze and capture images of the inventory. The foregoing components work in concert to identify items accurately and efficiently within inventory, calculate their size or amount, and calculate whether they are due to be replenished. This goal is accomplished by implementing algorithms that take input from the scales and the front-facing and rear-facing cameras to be processed through components of the network connection to output inventory data, and stocking recommendations, among other things. This is described more fully below.

Figure 3:
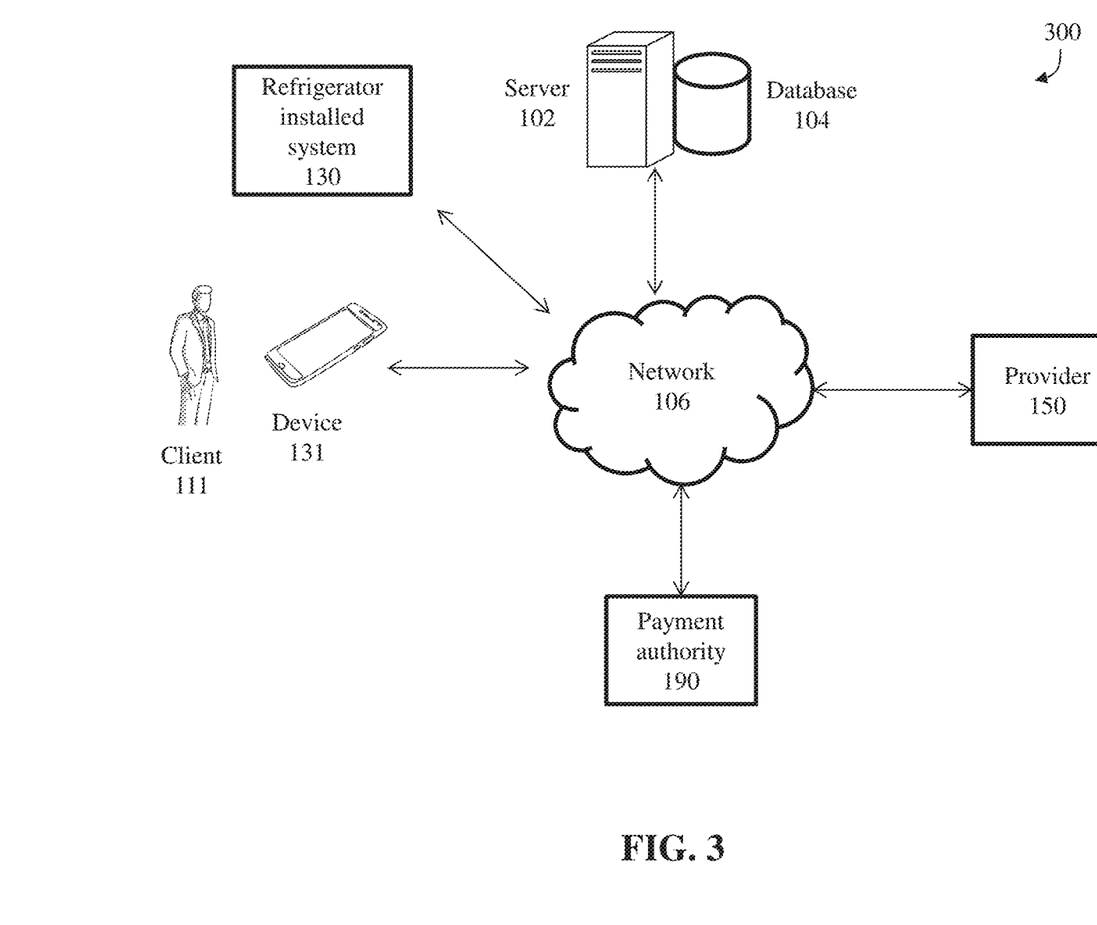
FIG. 3 is a block diagram illustrating the network architecture of a system for facilitating food inventory over a communications network, in accordance with one embodiment.

Referring now to the drawing figures in which like reference designators refer to like elements, there is shown in FIG. 3 an illustration of a block diagram showing the network architecture of a system 300 for facilitating food inventory over a communications network, in accordance with one embodiment. A prominent element of FIG. 1 is the server 102 associated with repository or database 104 and further communicatively coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, food inventory activities.

FIG. 1 includes mobile computing device 131, which may be smart phones, mobile phones, tablet computers, handheld computers, laptops, or the like. Mobile computing device 131 may correspond to a customer or client 111. A mobile application may execute on the user's device 131, wherein said mobile application interacts with the server 102 and the system 130. The terms "customer" or "client" are used loosely to designate any person or company utilizing the claimed embodiments. FIG. 1 also shows a server 102 and database or repository 104, which may be a relational database comprising a Structure Query Language (SQL) database stored in a SQL server. The repository 104 serves data from a database during the course of operation of the disclosed embodiments. Database 104 may be distributed over one or more nodes or locations that are connected via network 106.

The database 104 may include a user record for each customer or client 111. A user record may include contact/identifying information for the user (username, given name, telephone number(s), email address, etc.), information related to the food items and supplies the user is registered to receive, contact/identifying information for suppliers or providers of the user, electronic payment information for the user, sales transaction data associated with the user, etc. A user record may also include at any given moment location data about the user, a unique identifier for the user, and a description of past products purchased or used by the user. A user record may further include demographic data for the user, such as age, sex, income data, race, color, marital status, etc.

Sales transaction data may include one or more product/service identifiers, one or more product/service amounts, and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment.

The database 104 may include a food item record which may be associated with a user record. A food item record may include identifying information for the food item (name, brand, type, amount, size, etc.), information related to the supplier or distributor for each food items (contact information, name, address, phone number, email address), SKU, unique product identifier, sales transaction data associated with previous purchases of the food item, etc. A food item record may also include inventory data for each food item, such as the current location and amount of said food item in the refrigerator, how long said food item will be fit for consumption, how long until said food item will spoil, when the food item should be re-ordered, sales transaction data associated with previous purchases of the food item, etc.

FIG. 1 shows an embodiment wherein networked computing devices 131, 150, and 190 interact with server 102 and database 104 over the network 106. It should be noted that although FIG. 1 shows only the networked computers 131, 150, 190 and 102, the system of the disclosed embodiments supports any number of networked computing devices connected via network 106. Further, server 102, and units 131, 150, and 190 include program logic such as computer programs, mobile applications, executable files, or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 150, and 190. Further, server 102 and its functionality, according to a preferred embodiment, can be realized in a centralized fashion in one computer system or in a distributed fashion wherein different elements are spread across several interconnected computer systems. Additionally, the devices 131, 150, and 190 (or their functionality) may be integrated with other devices.

FIG. 1 also shows a payment authority 190, which acts to effectuate payments by user 111 or third party provider 150 for related products and/or services. In the course of a sales transaction, server 102 may interface with payment authority 190 to effectuate payment. In one embodiment, the payment authority 190 is a payment gateway, which is an e-commerce Application Service Provider (ASP) service that authorizes and processes payments from one party to another. The payment authority 190 may accept payment via the use of purchase cards, i.e., credit cards, charge cards, bank cards, gift cards, account cards, etc.

FIG. 1 also shows a third-party provider 150, which represents an organization or business that provides or supplies food related products or services to user 111. The third-party 150 may be a food distributor, a food supplier, a retail store, a market, a manufacturer, etc.

Figure 4A:
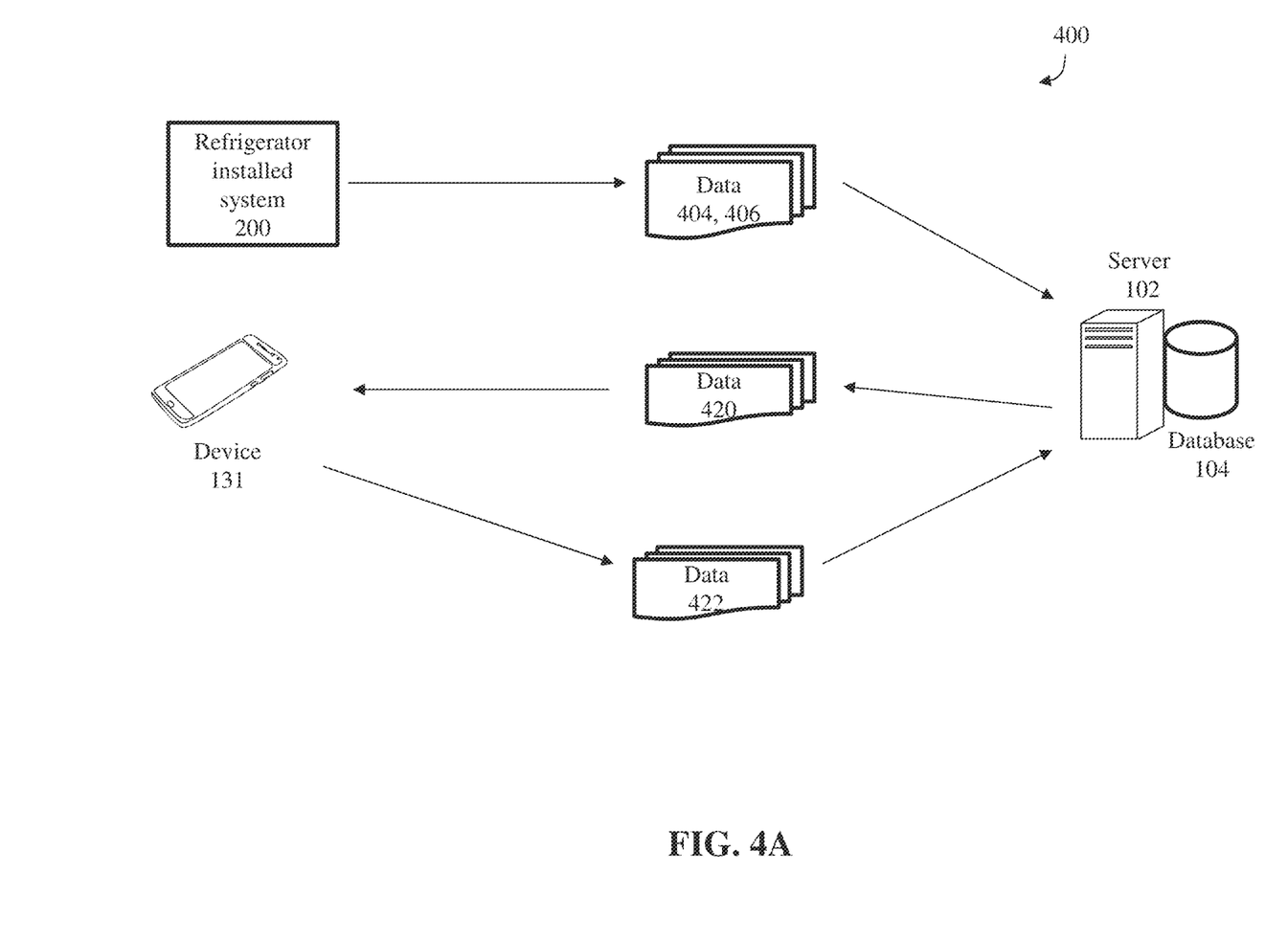
FIG. 4A is a block diagram showing the data flow of the process for facilitating food inventory over a communications network, according to one embodiment.
Figure 4B:
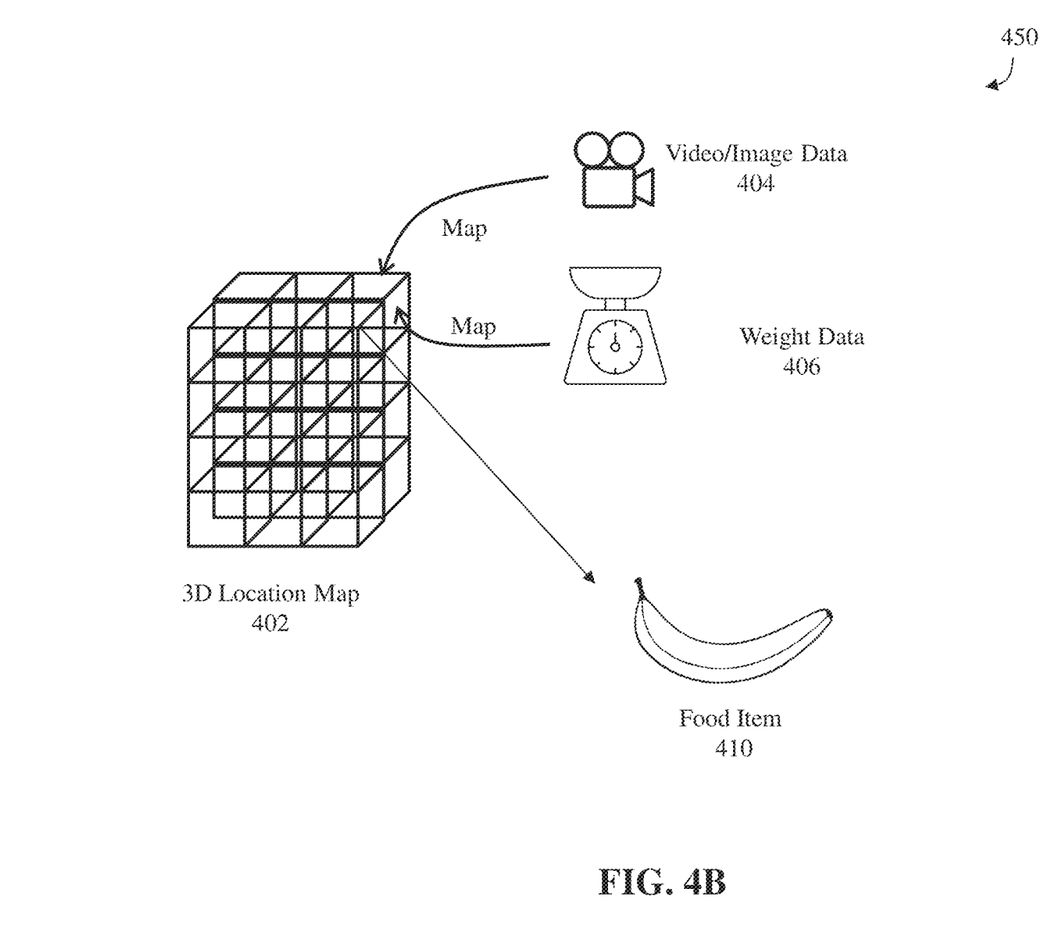
FIG. 4B is a block diagram depicting one aspect of a process for facilitating food inventory over a communications network, according to one embodiment
Figure 5:
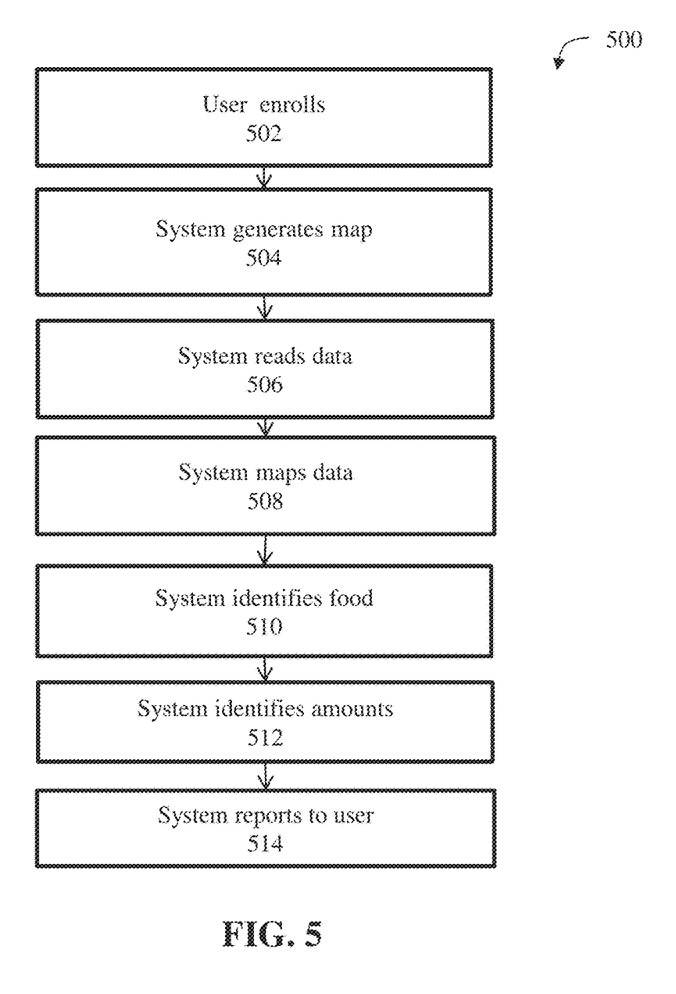
FIG. 5 is a flow chart depicting the general control flow of a process for facilitating food inventory over a communications network, according to one embodiment.

The process of facilitating food inventory over a communications network will now be described with reference to FIGS. 4A-5 below. FIGS. 4A-5 depict the data flow and control flow of the process for facilitating food inventory over a communications network 106, according to one embodiment. Note that any of the steps below which are described as being executed by system 200 may also be executed by server 102 or any combination of the two. The process of the disclosed embodiments begins with step 502 (see flowchart 500, FIG. 5), wherein the user 111 may enroll or register with server 102. In the course of enrolling or registering, the user may enter data into his device 131 by manually entering data into a mobile application via keypad, touchpad, or via voice. In the course of enrolling or registering, the user may enter any data that may be stored in a user record, and a food item record, as defined above. Also, in the course of enrolling or registering, the server 102 may generate a user record and a food item record for each registering user and store the user and food item records in an attached database, such as database 104.

In step 504, the system 200 and/or server 102 generates a three-dimensional location map of an interior of the refrigerated food storage compartment 120. A three-dimensional location map 402 is a mathematical representation of the three-dimensional space within the refrigerated food storage compartment 120. The map may be represented, among other ways, as a set of three-dimensional points using three dimensional coordinates in space. A shelf or other area where a food item is placed within the refrigerated food storage compartment 120 may be represented as a segment or portion of the three-dimensional location map 402.

In step 506, the system 200 and/or server 102 reads images from the at least four rear-facing cameras 207, and from the at least four forward-facing cameras 206, and reads weight measurements from the at least four load cell sensors, scales or weighing devices 205.

In step 508, the system 200 and/or server 102 maps the images from the at least four rear-facing cameras to segments of the three-dimensional location map 402, maps the images from the at least four forward-facing cameras to segments of the three-dimensional location map 402, and maps the weight measurements to segments of the three-dimensional location map 402, such that each segment of the three-dimensional location map 402 is associated with images and weight measurements.

A mapping function must be utilized for step 508. A mapping function is a mathematical algorithm that maps image data 404 and weight data 406 to segments of the three-dimensional location map 402. In this embodiment, the step of mapping data to the three-dimensional location map 402 includes encoding changes to the three-dimensional location map 402 based on the image data 404 and weight data 406. In this embodiment, the step of populating values in segments of the three-dimensional location map 402 include utilizing the mapping function that maps data from the images and weight data to three-dimensional location map 402. The mapping function includes an algorithm that determines to which segment of map 402 certain images from the cameras should be mapped. Said algorithm uses an object recognition system within a computer vision system to recognize where a certain image was garnered from within the refrigerated food storage compartment 120. Object recognition is a technology in the field of computer vision for finding and identifying objects in an image or video sequence. Computer vision is a scientific field that deals with how a computing device can gain high-level understanding from images or videos and includes methods for acquiring, processing, analyzing, and understanding images. In this embodiment, the system 200 and/or server 102 undertakes to understand where (as in location) a certain image from a camera was garnered from within the refrigerated food storage compartment 120, using the three-dimensional location map 402 to identify said location.

The mapping function may include conversion functions wherein source data from the scales is read and converted into a different format for storage into the target data in the three-dimensional location map 402. For example, value data 406 from the scales may be weight data in pounds. In this example, the mapping function includes a conversion function wherein the weight data is converted from pounds into kilograms, and the converted data is stored in connection with three-dimensional location map 402.

In another embodiment, the mapping function may include an algorithm that determines to which segment of map 402 certain weight data 406 from the scales should be mapped. Said algorithm may use a hard coded data structure, such as a linked list or an array, which defines where certain weight data was garnered from within the refrigerated food storage compartment 120. In this embodiment, the mapping function employed by system 200 and/or server 102 undertakes to understand where (as in location) certain weight data from a scale was garnered from within the refrigerated food storage compartment 120, using the three-dimensional location map 402 to identify said location.

In step 510, for each segment of the three-dimensional location map 402, the system 200 and/or server 102 identifies a type of food item within said segment based on the image data 404 and weight data 406 associated with said segment. Again, the system 200 and/or server 102 includes an algorithm that determines the identity of a food item 410 within a segment of the three-dimensional location map 402. Said algorithm uses an object recognition system within a computer vision system to recognize the identity of a food item within the refrigerated food storage compartment 120 based on the image data and weight data that was collected. In this embodiment, the system 200 and/or server 102 undertakes to understand the identity of a food item 410 within the refrigerated food storage compartment 120, using the three-dimensional location map 402 to identify the location of said item.

In step 512, for each food item 410 that was identified, the system 200 and/or server 102 calculates a current amount of said food item based on the image data 404 and weight data 406 associated with the segment in which the food item is located. Again, the system 200 and/or server 102 includes an algorithm that determines the amount of a food item (as in weight, volume, or generally how much of it is left) within a segment of the three-dimensional location map 402. Said algorithm uses an object recognition system within a computer vision system to recognize the amount of a food item within the refrigerated food storage compartment 120 based on the image data and weight data that was collected. In this embodiment, the system 200 and/or server 102 undertakes to understand the amount of a food item within the refrigerated food storage compartment 120, using the three-dimensional location map 402 to identify the location of said item.

Also in step 512, for each food item 410 that was identified, system 200 and/or server 102 calculates a date of expiration of said food item based on the image data 404 and weight data 406 associated with the segment in which the food item is located. Also in step 512, for each food item 410 that was identified, system 200 and/or server 102 calculates a recommended date by which additional amounts of said food item should be ordered.

In step 514, for each food item that was identified, the system 200 and/or server 102 reports to a user 111 the data calculated in step 512 above, such as the type of said food item, the amount of said food item, the date of expiration of said food item and the recommended date by which additional amounts of said food item should be ordered, sent as data 420. This reporting may be done via a mobile application executing on the user's device 131, such that data 420 may be displayed on said mobile application. The user 111 may then send to server 102 a request 422 to replenish any food items that are depleted or near depleted. The server 102 may then effectuate a payment from the user using his electronic payment information via payment authority 190 and make an order with provider 150 for said food items that are depleted or near depleted.

Figure 6:
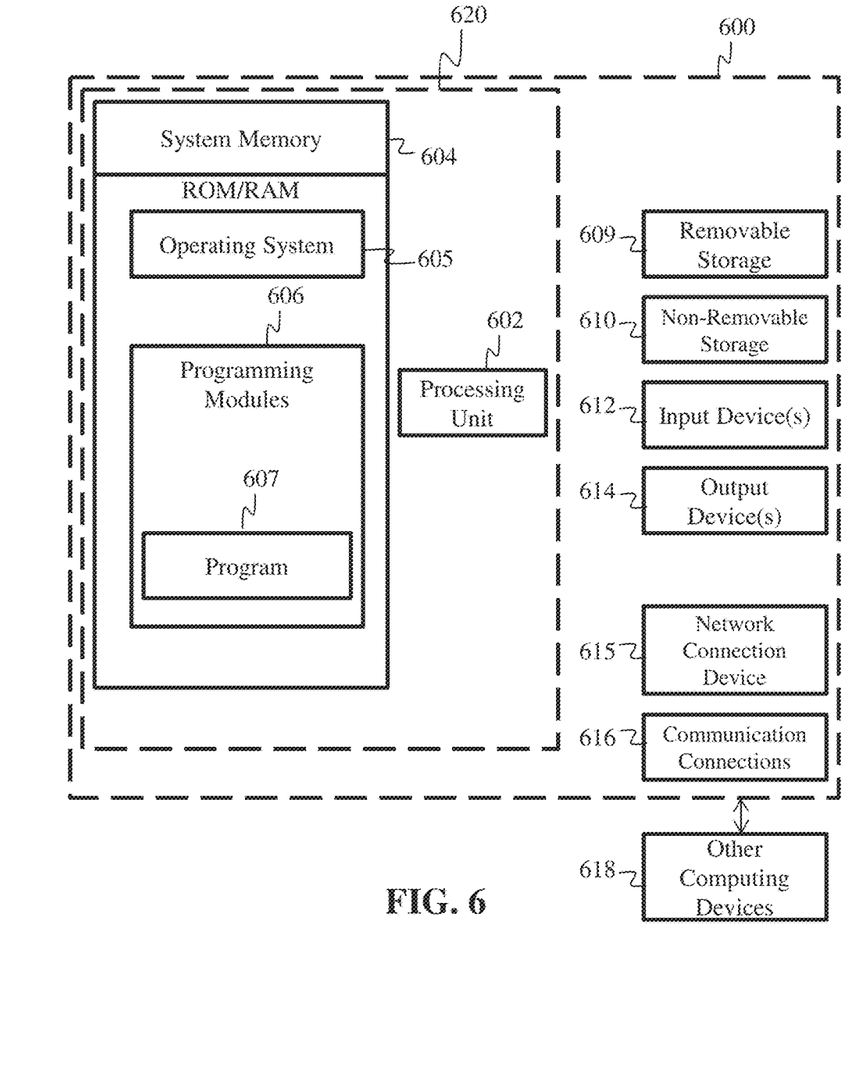
FIG. 6 is a block diagram depicting a system including an example computing system and other computing devices.

FIG. 6 is a block diagram of a system including an example computing device 600 and other computing devices. Consistent with the embodiments described herein, the aforementioned actions performed by devices 102, 131, 150 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for systems 100, 200, 300 and process 500, as described above. Process 500 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of devices 102, 131, 150. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 500 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including hand-held devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A food inventory tracking system for a refrigerated food storage compartment, comprising:
 a) at least four rear-facing cameras located at a forward end of the refrigerated food storage compartment, wherein the cameras are configured for capturing images of food stored within the refrigerated food storage compartment;

b) at least four forward-facing cameras located at a rear end of the refrigerated food storage compartment, wherein the cameras are configured for capturing images of food stored within the refrigerated food storage compartment;

c) at least four load cell sensors located within the refrigerated food storage compartment, wherein the at least four load cell sensors are configured for taking weight measurements of food stored within the refrigerated food storage compartment;

d) a computing system including a processor and a memory, the computing system configured for:

1) generating a three-dimensional location map of an interior of the refrigerated food storage compartment;

2) reading images from the at least four rear-facing cameras, reading images from the at least four forward-facing cameras, and reading weight measurements from the at least four load cell sensors;

3) mapping the images from the at least four rear-facing cameras to segments of the three-dimensional location map, mapping the images from the at least four forward-facing cameras to segments of the three-dimensional location map, and mapping the weight measurements to segments of the three-dimensional location map, such that each segment of the three-dimensional location map is associated with images and weight measurements;

4) for each segment of the three-dimensional location map, identifying a type of food item within said segment based on the images and weight measurements associated with said segment;

5) for each food item that was identified, calculating a current amount of said food item based on the images and weight measurements associated with the segment in which the food item is located; and 6) for each food item that was identified, reporting to a user the type of said food item and the amount of said food item.

2. The system of claim 1, further comprising a wireless network connection communicatively coupled with the computing system.

3. The system of claim 2, wherein the computing system is further configured for:

for each food item that was identified, calculating a date of expiration of said food item based on the images and weight measurements associated with the segment in which the food item is located.

4. The system of claim 2, wherein the computing system is further configured for:

for each food item that was identified, calculating a recommended date by which additional amounts of said food item should be ordered.

5. A food inventory tracking system for a refrigerated food storage compartment, comprising:

a) at least four rear-facing cameras located at a forward end of the refrigerated food storage compartment, wherein the cameras are configured for capturing images of food stored within the refrigerated food storage compartment;

b) at least four forward-facing cameras located at a rear end of the refrigerated food storage compartment, wherein the cameras are configured for capturing images of food stored within the refrigerated food storage compartment;

c) at least four load cell sensors located within the refrigerated food storage compartment, wherein the at least four load cell sensors are configured for taking weight measurements of food stored within the refrigerated food storage compartment;

d) a computing system within the refrigerated food storage compartment, the computing system including a processor and a memory, the computing system configured for:

1) generating a three-dimensional location map of an interior of the refrigerated food storage compartment;

2) reading images from the at least four rear-facing cameras, reading images from the at least four forward-facing cameras, and reading weight measurements from the at least four load cell sensors;

3) mapping the images from the at least four rear-facing cameras to segments of the three-dimensional location map, mapping the images from the at least four forward-facing cameras to segments of the three-dimensional location map, and mapping the weight measurements to segments of the three-dimensional location map, such that each segment of the three-dimensional location map is associated with images and weight measurements;

4) for each segment of the three-dimensional location map, identifying a type of food item within said segment based on the images and weight measurements associated with said segment;

5) for each food item that was identified, calculating a current amount of said food item based on the images and weight measurements associated with the segment in which the food item is located; and 6) for each food item that was identified, reporting to a user the type of said food item and the amount of said food item.

6. The system of claim 5, further comprising a wireless network connection communicatively coupled with the computing system.

7. The system of claim 6, wherein the computing system is further configured for:

for each food item that was identified, calculating a date of expiration of said food item based on the images and weight measurements associated with the segment in which the food item is located.

8. The system of claim 6, wherein the computing system is further configured for:

for each food item that was identified, calculating a recommended date by which additional amounts of said food item should be ordered.

9. A food inventory tracking system for a refrigerated food storage compartment, comprising:

a) at least four rear-facing cameras located at a forward end of the refrigerated food storage compartment, wherein the cameras are configured for capturing images of food stored within the refrigerated food storage compartment;

b) at least four forward-facing cameras located at a rear end of the refrigerated food storage compartment, wherein the cameras are configured for capturing images of food stored within the refrigerated food storage compartment;

c) at least four load cell sensors located within the refrigerated food storage compartment, wherein the at least four load cell sensors are configured for taking weight measurements of food stored within the refrigerated food storage compartment;

d) a network connection device coupled to the at least four rear-facing cameras, the at least four forward-facing cameras, and at least four load cell sensors, the network connection device configured for transmitting images and weight measurements from the at least four rear-facing cameras, the at least four forward-facing cameras, and the at least four load cell sensors to a server;

e) the server including a processor and a memory, the computing system configured for:

1) receiving images and weight measurements from the at least four rear-facing cameras, the at least four forward-facing cameras, and at the least four load cell sensors;

2) generating a three-dimensional location map of an interior of the refrigerated food storage compartment;

3) mapping the images from the at least four rear-facing cameras to segments of the three-dimensional location map, mapping the images from the at least four forward-facing cameras to segments of the three-dimensional location map, and mapping the weight measurements to segments of the three-dimensional location map, such that each segment of the three-dimensional location map is associated with images and weight measurements;

4) for each segment of the three-dimensional location map, identifying a type of food item within said segment based on the images and weight measurements associated with said segment;

5) for each food item that was identified, calculating a current amount of said food item based on the images and weight measurements associated with the segment in which the food item is located; and 6) for each food item that was identified, reporting to a user the type of said food item and the amount of said food item.

10. The system of claim 9, wherein the computing system is further configured for:

for each food item that was identified, calculating a date of expiration of said food item based on the images and weight measurements associated with the segment in which the food item is located.

11. The system of claim 10, wherein the computing system is further configured for:

for each food item that was identified, calculating a recommended date by which additional amounts of said food item should be ordered.

* * * * *